United States Patent [19]
Ward

[11] Patent Number: 5,669,538
[45] Date of Patent: Sep. 23, 1997

[54] BOTTOM CLOSURE WITH AUTOMOBILE DRINK-HOLDER ADAPTOR FOR A SLEEVE-TYPE BEVERAGE INSULATOR

[76] Inventor: William M. Ward, 303 S. 123rd. E. Place, Tulsa, Okla. 74128

[21] Appl. No.: 709,825

[22] Filed: Sep. 10, 1996

[51] Int. Cl.$^6$ ........................................ B60R 7/00
[52] U.S. Cl. ................... 224/539; 224/148.3; 224/148.4; 224/926; 62/457.4; 220/903; 248/311.2; D07/619
[58] Field of Search .................. 224/148.1, 148.3, 224/148.7, 926, 148.4; 62/457.1, 457.4, 457.5; 215/344; 220/902, 903, 906; 248/311.2; D07/619, 620, 624, 625

[56] References Cited

U.S. PATENT DOCUMENTS

| | | |
|---|---|---|
| D. 229,655 | 12/1973 | Cyren . |
| D. 266,391 | 10/1982 | Jordon . |
| D. 303,199 | 9/1989 | Parsons . |
| D. 309,073 | 7/1990 | Robinson . |
| D. 368,410 | 4/1996 | Shiner . |
| 2,936,926 | 5/1960 | Miller . |
| 3,263,806 | 8/1966 | Ring ........................ 224/148.3 |
| 3,302,427 | 2/1967 | Stoner et al. . |
| 3,306,566 | 2/1967 | Paulson et al. . |
| 3,419,240 | 12/1968 | Santic . |
| 3,578,199 | 5/1971 | Duncan ..................... 224/148.3 |
| 3,899,098 | 8/1975 | Hutchins .................... 220/903 |
| 4,014,456 | 3/1977 | Echtle ....................... 220/902 |
| 4,163,374 | 8/1979 | Moore et al. ............... 220/903 |
| 4,298,554 | 11/1981 | Vogel et al. ............... 220/902 |
| 4,360,114 | 11/1982 | Owens ....................... 215/344 |
| 4,733,790 | 3/1988 | Stein . |
| 4,892,215 | 1/1990 | Carlson et al. . |
| 5,052,649 | 10/1991 | Hunnicutt ................... 224/926 |
| 5,088,673 | 2/1992 | Chandler . |
| 5,261,554 | 11/1993 | Forbes ...................... 224/148.3 |
| 5,531,353 | 7/1996 | Ward et al. . |

*Primary Examiner*—Henry J. Recla
*Assistant Examiner*—Gregory M. Vidovich
*Attorney, Agent, or Firm*—William S. Dorman

[57] ABSTRACT

The present device relates generally to a bottom closure for an insulated sleeve-type beverage holder. The closure is composed of a rigid plastic material and is designed to be reliably affixed to the base of a tubular sleeve of insulating foam. In a preferred embodiment of the present device, the closure contains apertures therethrough to relieve vacuum and pressure conditions that might otherwise arise during the insertion and removal of a beverage container. On its upper side, the closure contains a plurality of circular ridges, the ridges possessed of an inside bevel, whose purpose is to improve the adhesion between the closure and the insulating sleeve. On its underside, the closure contains a short cylindrical sidewall which is designed to accept a removable storage portion, the storage portion adapting the insulated beverage holder to make it suitable for use in an automobile beverage holder. The sidewall contains indentations on its outer surface at a plurality of locations so as to allow unobstructed air flow into and out of the storage portion between the inner wall of the storage portion and the outer wall of the sidewall. The underside of the closure also contains a plurality of radial ribs which act to prevent the storage portion from making a tight seal with the underside of the closure. The dimensions of the storage portion are chosen so as to allow it to fit within the beverage holders found in most automobiles.

12 Claims, 2 Drawing Sheets

BOTTOM CLOSURE WITH AUTOMOBILE DRINK-HOLDER ADAPTOR FOR A SLEEVE-TYPE BEVERAGE INSULATOR

I. BACKGROUND OF THE INVENTION

A. Field of the Invention

The present invention relates generally to a bottom closure for a sleeve-type beverage insulator. In particular, the present invention is directed toward an improved bottom closure for sleeve-type insulators that has a detachable member that may be used for storage, said detachable member, when attached, also functioning to position the insulated sleeve and closure combination within a typical automobile beverage receptacle or holder. The bottom closure, with or without its detachable member in place, is constructed so as to prevent the formation of vacuum and over pressure conditions that can occur when a container is inserted into or removed from the insulating sleeve. Said bottom closure also contains structures thereon that improve its adhesion to the insulating sleeve.

B. Description of the Prior Art

The use of sleeve-type beverage insulators continues to grow in popularity. These sleeves are usually manufactured of closed cell foam rubber or the like and are sized to accommodate canned beverages such as a soft drink or beer. Their thermal conductive properties make them reasonably efficient insulators, thus a chilled can that has been inserted into one of these sleeves stays cool longer than it would otherwise. These sleeves are typically relatively inexpensive to manufacture and can be easily imprinted with a business design or logo and may even be given away as promotional items.

These sleeves are usually little more than a tubular piece of soft insulating foam, to which has been attached some sort of bottom closure. Generally speaking, the bottom closures are of two broad types: thick circular foam plugs that are glued inside the foam tube and flat disk-shaped members that attach outside of the sleeve and are cemented to its end. The plug-type closures might be made from the same sort of foam material as the sleeve and are circular in shape, with an outer diameter slightly less than the inner diameter of the sleeve tube. Typically, plug-type closures have a single hole penetrating the center of the plug. This hole prevents the formation of vacuum or over pressure conditions that can result when a container is withdrawn from or inserted into a sleeve with a solid bottom closure. The single hole also allows a small amount of condensation to escape from the insulating sleeves, although this is usually only a minor effect since the hole is not optimally located for drainage purposes.

The plug-type bottom closures suffer from several disadvantages. Among them are that they can be problematic to assemble, as the foam plug must be accurately positioned and held while it is being glued into the sleeve. Additionally, moisture in the form of condensation can collect inside the sleeve against the plug, as there is no ready path for said moisture to leave the device. Finally, the foam plug insert imparts only minimal additional rigidity to the base of the sleeve, thereby making removal of a can therefrom more difficult. This difficulty arises because a user typically removes an empty can by grasping the top of the beverage container in one hand and the base of the insulating sleeve in the other, and then pulling the two members in opposite directions. It the base of the sleeve lacks rigidity, the sleeve will tend to collapse against the enclosed can, thereby increasing the friction between the two members and making the task of removal correspondingly more difficult.

A disk-type bottom closure, of which the present invention is an example, is typically manufactured from a different material than that of the sleeve, often of some sort of polyvinyl chloride, a soft plastic that is also relatively flexible. However, by choosing the appropriate material for the closure, some additional stiffening can be imparted to the sleeve-closure combination, resulting in a more durable and functional device. Preferably, the disk-type closure will have one or more holes placed therein, to circumvent potential pressure problems during insertion and extraction of the container, and to provide an avenue for condensation to escape. From a manufacturing standpoint, flat disk-type closures are simpler than foam plugs to position for attachment to the base of the foam sleeve. Further, hard plastic bottom closures are non-porous and are relatively unaffected by moisture. Finally, a hard plastic bottom closure imparts rigidity to the sleeve making insertion and, more significantly, removal of a beverage container easier.

The disk-type bottom closures, however, suffer from one important disadvantage. Depending on the choice of material used to form the disk, it may prove to be difficult to affix the closure to the base of the sleeve with adhesive. Because hard plastic materials are durable, easily molded, and inexpensive, they are a natural choice for the material of the closure. Unfortunately, most adhesives do not bond well to them, thereby resulting in an end closure that separates from the foam sleeve after a relatively short period of use.

More generally, a disadvantage of all tubular foam beverage insulating sleeves is that they are not sized properly to fit within the storage receptacles or holders that are found in most automobiles. This creates a dilemma for the individual who wishes to transport an insulated beverage from, say, home to work via automobile. Individuals who insist on taking the insulated beverage with them are forced to rest it on the seat, floorboard, or dashboard, a stratagem that risks a spill if the automobile accelerates or stops suddenly.

Heretofore, as is well known in the insulated beverage holder industry, there has been a need for a disk-type bottom closure for an insulating sleeve that can be made of plastic and that can be made to fit within standard automobile beverage receptacles. In particular, the bottom closure should ideally be made of relatively hard plastic material, which would impart some rigidity to the foam insulating sleeve, but which could also be reliably attached to the insulating foam. Finally, it would additionally be advantageous to have a removable storage member attached to the bottom closure that could be used to store small items such as change or keys.

Accordingly, it should now be recognized, as was recognized by the present inventor, that there exists, and has existed for some time, a very real need for a rigid plastic insulating sleeve bottom closure which would address and solve the above-described problems.

Briefly, the bottom closure described herein is constructed of relatively hard plastic and is specially designed to attach reliably to the end of a sleeve-type insulated beverage holder. In addition, it is built to accommodate a removable plastic storage container which doubles as an adapter which allows the insulating sleeve-type beverage holder to fit within standard automobile beverage holding trays. The sleeve and bottom closure combination may be used with the attached storage container in an automobile or removed for greater stability when the user is not in a moving vehicle. Further, a novel method is taught herein for reducing the over pressure and vacuum conditions that would otherwise arise during insertion and removal of a canned beverage from the sleeve when the adaptor is attached to the bottom of the closure.

After the present invention was conceived and constructed, a patent search was conducted in the United States Patent and Trademark Office for the purpose of determining whether any similar or related solutions had been previously developed to the foregoing problem. That patent search produced the following references relating to bottom closures:

| Patent No. | Inventor | Title | Issue Date |
|---|---|---|---|
| 2,936,926 | Miller | Pail Holder | May 17, 1960 |
| 3,419,240 | Santic | Garbage Can Protector | Dec. 31, 1968 |
| 4,733,790 | Stein | Combination Drip Pan and Container Lid | Mar. 29, 1988 |
| 4,892,215 | Carlson et al. | Bottom Closure for a Beverage Container Sleeve | Jan. 9, 1990 |
| 5,531,353 | Ward et al. | Drinking Cup Device | Jul. 2, 1996 |

Miller U.S. Pat. No. 2,936,926 discloses a garbage pail holder which attaches to the base of the garbage pail and catches spills therefrom. Santic U.S. Pat. No. 3,419,240 discloses an apparatus for protecting a garbage can from rough treatment during handling by trash collectors. The Miller U.S. Pat. No. 2,936,926 and Santic U.S. Pat. No. 3,419,240 inventions fit about the base of the trash can in a configuration reminiscent in shape to that of a bottom closure attached to an insulating sleeve, but neither teaches a method of reducing vacuum and over pressure conditions during installation and removal, nor does either teach how said base might be reliably and permanently attached to a foam insulating sleeve. Neither is designed to be used with a sleeve-type foam insulated beverage holder and neither teaches how the device may be adapted for use in an automobile drink holder.

Stein U.S. Pat. No. 4,733,790 discloses a combined liquid container lid and mating drip pan for use with paint cans. But, like Santic and Miller discussed previously, it does not teach a method of reducing vacuum and over pressure conditions during installation nor does it teach how said base might be reliably and permanently attached to a foam insulating sleeve. Stein's invention is not designed to be used with a sleeve-type foam insulated beverage holder and nor does Stein teach how the device may be adapted for use in an automobile drink holder.

Carlson et al. U.S. Pat. No. 4,892,215 discloses a bottom closure for a sleeve-type beverage holder. Carlson's closure is preferably made of soft flexible polyvinyl chloride, a material that can be reliably cemented to the foam insulating tube. Carlson does not teach how a hard plastic base might reliably be attached to a foam insulating sleeve nor does he teach how the device may be adapted for us in an automobile drink holder.

Ward et al. U.S. Pat. No. 5,531,353 discloses a drinking cup device that contains a detachable member that may be used for storage and which acts to position the drinking cup device within a receptacle or holder. Ward et al. does not teach how a hard plastic base might reliably be attached to a foam insulating sleeve nor does he disclose a method of reducing the vacuum and over pressure conditions which occur when a beverage container is removed and inserted while the adaptor is in place.

Thus, the above-listed patents are clearly distinguishable from the present invention, a description of which is set forth below. Before proceeding to that description, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

II. SUMMARY OF THE INVENTION

The instant invention provides a bottom closure for an insulating sleeve-type beverage can holder which is constructed preferably of a hard plastic material. It is an object of the present invention to provide a bottom closure that can be attached reliably to the foam insulating sleeve. Another object of the present invention is to provide a means by which said closure can be adapted to fit in an automobile beverage tray. A further object of the present invention is to provide an insulated beverage holder which contains an integrated storage unit, wherein small items such as keys or coins may be stowed.

By means of one aspect of the present invention there has been provided an apparatus composed of hard plastic for closing the bottom of an insulating sleeve-type beverage holder and capable of being reliably adhered thereto. The insulating sleeve portion of the beverage holder is constructed of soft foam, tubular in general shape, and of inner diameter and height suitable to receive a beverage can therein. The bottom closure is circular in plan view and has at its periphery a short cylindrical outer sidewall with an internal diameter substantially equal to the outer diameter of the sleeve portion. Said outer sidewall rises above the surface of said closure and also extends below it, with the inner surface of the portion rising above the closure designed to be in continuous contact with the outer surface of the foam sleeve. Speaking for the moment only of the top of said closure, within and co-axial with said outer sidewall is a short inner cylindrical sidewall having an external diameter substantially equal to the inner diameter of the foam sleeve. Thus, the distance between the inner and outer sidewalls is slightly greater than the thickness of the foam sleeve and the base of the sleeve is inserted between these two sidewalls. Within said inner sidewall is a flat circular region containing a plurality of holes therethrough, said holes tending to relieve over pressure and vacuum conditions during beverage can insertion and withdrawal.

Between the inner and outer sidewalls is a flat annular region upon which has been formed a plurality of raised circular ridges, said ridges co-axial with said sidewalls and of a particular shape. These circular ridges are designed to be in continuous contact with the base of the foam sleeve and provide a reliable means of adhering said sleeve to said closure. Each circular ridge is undercut by a reverse or inside bevel, thereby creating a circular overhang. Liquid adhesives applied to said annular region are forced under said overhangs. After the adhesive dries, said overhangs trap part of the resulting dried adhesive film thereunder, making it more difficult for the film, and thus the foam sleeve, to be pulled free of the bottom closure.

By means of a second aspect of the present invention there has been provided an apparatus composed of hard plastic for closing the bottom of an insulating sleeve-type beverage holder, said closure being equipped on its underside with a removable adaptor member which allows it to be secured by a typical automobile beverage holder. The upper surface of the present embodiment is generally as described above, although the circular ridges are not essential to this embodiment. Speaking for the moment strictly of the underside of the bottom closure, the outer cylindrical sidewall has been extended below said closure, thereby providing a stable base for the device when it is not fitted with the adaptor. The adaptor member has been sized so as to fit within an automobile beverage holder and is preferably formed in the shape of a hollow frustum, having a circular open top and a base which is smaller than the automobile drink holder opening. When said adaptor member is attached to the underside of the bottom closure, the insulating beverage holder may be seated on top of the automobile beverage tray with the adaptor extending down into a tray opening and being held in place thereby. The adaptor is preferably mated removably to the bottom closure by pressing its open top against a short cylindrical inner wall on the underside of the closure. Said underside cylindrical wall is sized slightly smaller in outer diameter than the inner diameter of the top of the adaptor, thereby providing a means of connecting the adaptor to the closure. When the open end of the adaptor is pressed against the underside cylindrical wall, it will take the cylindrical wall inside it and be held there in place by contact between a cylindrical snap ring on the inside wall of the adaptor and a cylindrical snap ring grove that has been impressed into the outer wall of the underside cylindrical wall. The adaptor, being hollow, also provides a convenient place in which to store small items such as coins and keys.

If care is not otherwise taken, when the adaptor is attached to the bottom of the closure the pressure relief holes in the center of the closure will become blocked, thereby causing pressure buildup when a can is inserted into the beverage holder. The present inventor has discovered two modifications that can be made to the previous embodiment, whereby proper functioning of the pressure relief holes can be assured. First, a plurality of raised radial ribs are placed on the under side of the bottom closure, said ribs originating at the outside surface of the underside cylindrical wall and terminating at the inner edge of the outer cylindrical wall. The function of said ribs is to prevent the open end of the adaptor from coming into direct contact with the underside of the bottom closure and thereby creating an air seal. The second modification is that the outer surface of the underside cylindrical wall must be notched or narrowed at a plurality of locations, thereby of the underside cylindrical wall must be notched or narrowed at a plurality of locations, thereby creating longitudinal recesses which provide air passageways between the outside of the underside cylindrical wall and the inside surface of the adaptor. When a beverage container is inserted into the insulator while the adaptor is in place, air rushes down through the pressure relief holes in the adaptor, up through the scalloped regions of the underside cylindrical wall, and then exits out into the atmosphere through the space between the open end of the adaptor and the underside of the bottom closure. Thus, the inside of the beverage insulator remains in aerodynamic communication with the atmosphere while a can is inserted or removed.

Finally, by means of a third aspect of the present invention there has been provided an apparatus composed of hard plastic for closing the bottom of an insulating sleeve-type beverage holder, said closure being equipped on its underside with a permanent adaptor which allows it to be secured by a typical automobile beverage holder. The adaptor would be of similar external dimensions to the removable storage member discussed above, but made instead to be a permanent part of said bottom closure.

III. BRIEF DESCRIPTION OF THE DRAWINGS

Figure 1:
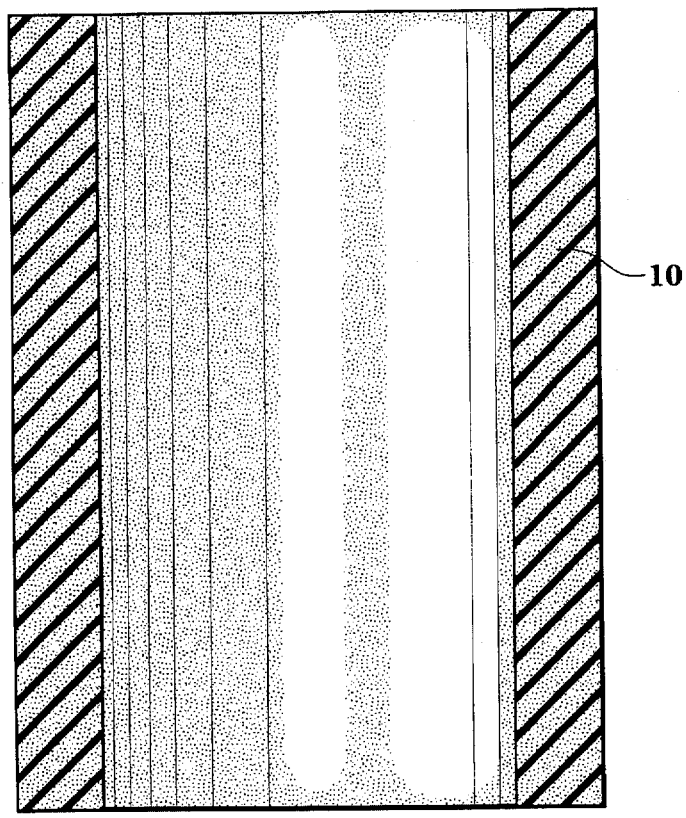
FIG. 1 is a cross sectional side view of the essential elements of a presently preferred embodiment of the instant invention wherein a bottom closure for a sleeve-type beverage container with adaptor device installed is shown.
Figure 1:
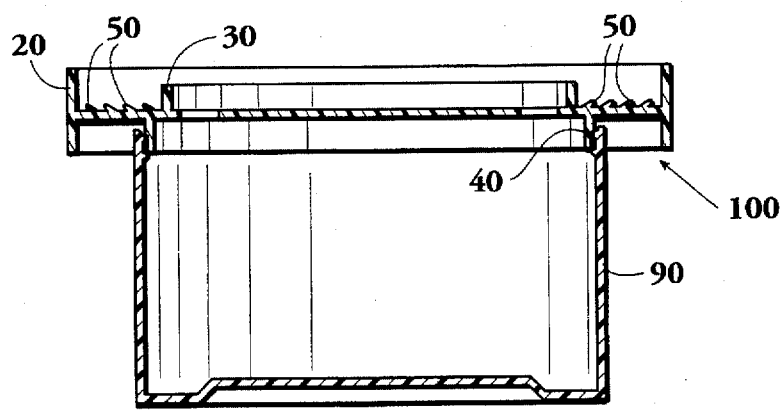

Referring to the drawings in detail, wherein like numerals denote identical elements throughout the several views, there is shown in FIG. 1 a cross-sectional view of a preferred embodiment of the present invention, wherein there is provided a sleeve-type insulating beverage insulator 10 together with the bottom closure of the present invention, indicated generally at 100, and the adaptor member 90, shown attached. The insulating sleeve 10 portion of the device is old and well known in the art and is generally constructed of foamed polystyrene, polyurethane or other similar materials. Said insulating sleeve 10 is tubular in shape, has a height approximately the same as that of a typical aluminum beverage container, and has an inner diameter sufficient to accommodate said container.

Figure 3:
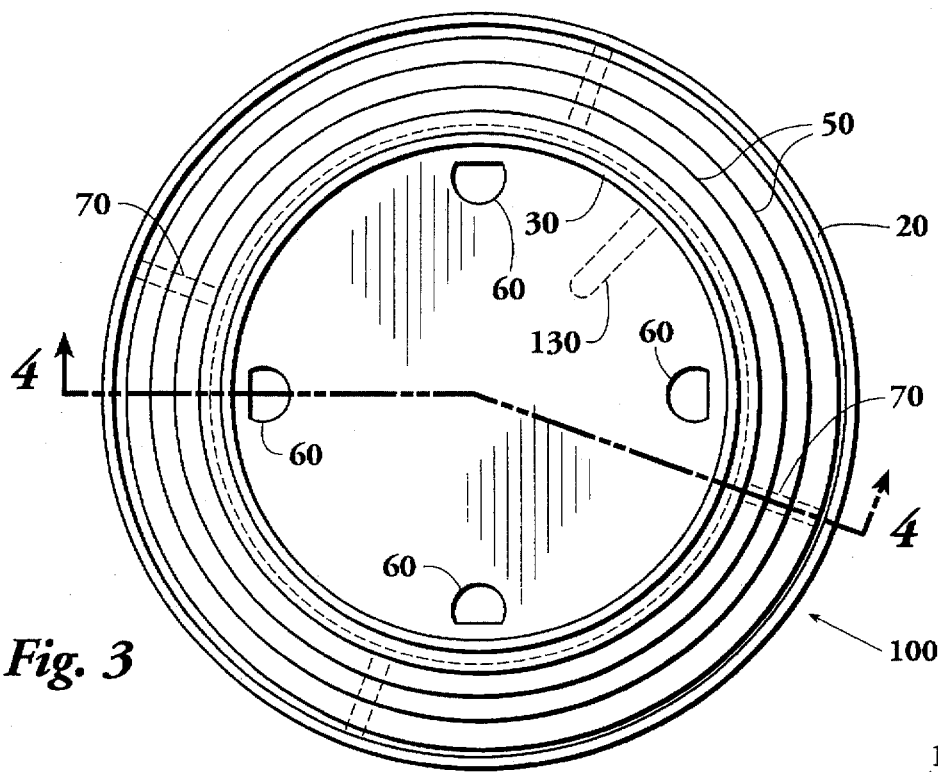
FIG. 3 is a top plan view of the bottom closure.
Figure 4:
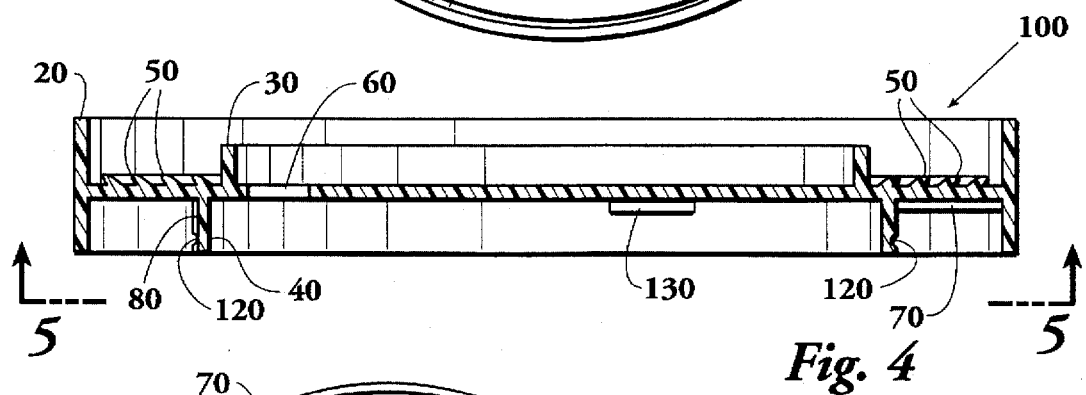
FIG. 4 is a cross sectional view of the bottom closure taken along the line 4—4 of FIG. 3.

The bottom closure 100 is generally disk-shaped and is preferably formed of hard plastic. At the periphery of said closure 100 is a short cylindrical outer sidewall 20, said outer sidewall 20 extending both above the surface of said closure 100 and below it as is best illustrated in FIG. 4. The inner portion of the outer sidewall 20 that extends above the surface of said closure 100 is designed to be in continuous contact with the outer surface of the end portion of the foam insulating sleeve 10. Speaking now exclusively of the upper surface of the closure 100, within said outer sidewall 20, and concentric therewith, is an inner cylindrical sidewall 30. Said inner sidewall 30 is positioned at distance from said outer sidewall 20 such that the base of the insulating sleeve 10 fits snugly therein, the outer surface of said inner sidewall 30 being in continuous contact with the inside wall of the end portion of said insulating sleeve 10. As shown in FIG. 3, within said inner sidewall 30 is a flat circular region containing a plurality of holes 60 therethrough, said holes 60 tending to relieve over pressure and vacuum conditions during beverage can insertion and withdrawal.

Between the inner cylindrical sidewall 30 and the outer cylindrical sidewall 20 is an annular generally planar region upon which has been formed a plurality of raised circular ridges 50 concentric with said inner 30 and outer 20 sidewalls (FIGS. 3 and 4). Each circular ridge 50, has an inside bevel placed therein along its entire length, thereby creating a circular overhang, a feature best illustrated in FIG. 4. This feature works equally well whether the overhangs in the circular ridges 50 face the center of the disk or its periphery, the key feature being the presence of an overhang.

The overhang of said circular ridge 50 acts to increase the strength of the adhesive bond between the bottom closure 100 and the foam sleeve 10 as follows. When liquid adhesive is spread on the plastic surface between said inner 30 and outer 20 sidewalls, a portion of said adhesive is forced underneath the circular overhangs created by the ridges 50. After the adhesive dries, said overhangs then tend to "hook into" or restrain the dried adhesive film, thereby providing an enhanced bond between the adhesive and the bottom closure 100. This enhanced bond ultimately results in the insulating sleeve 10 being bonded more reliably to the bottom closure 100.

Figure 2:
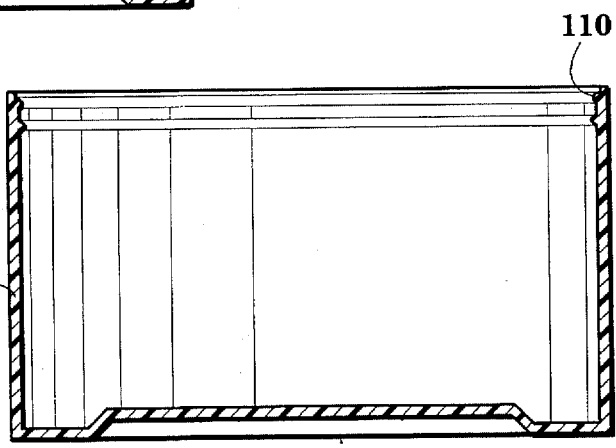
FIG. 2 is a cross sectional view of the removable adaptor/storage portion of the presently preferred embodiment.
Figure 5:
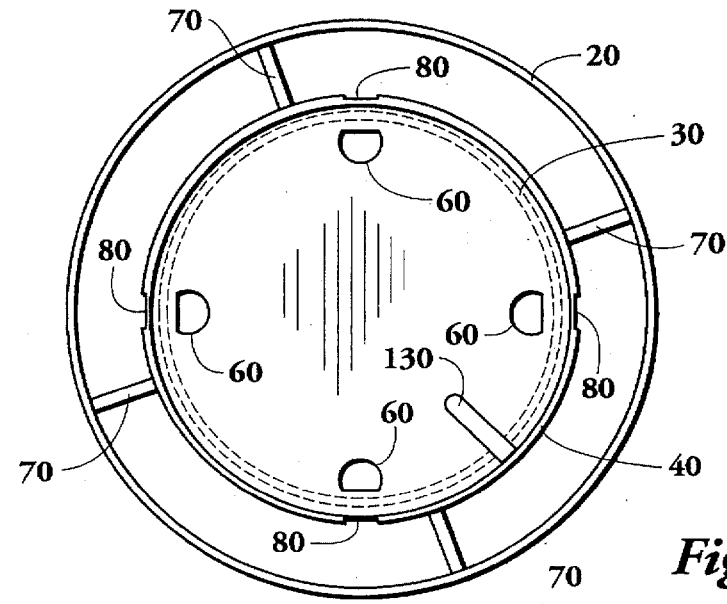
FIG. 5 is an underside plan view of the bottom closure with adaptor/storage portion removed.

Speaking now exclusively of the underside of the bottom closure 100 as illustrated in FIG. 5, the outer cylindrical sidewall 20 is preferably extended below the underside surface of said closure 100, which further includes an underside inner cylindrical sidewall 40, thereby providing a stable base for the device when the adaptor device 90 is not attached. The underside inner cylindrical sidewall 40 is coaxial with said outer cylindrical sidewall 20 and is of a diameter slightly smaller than that of the open top of the adaptor 90, the features of said adaptor 90 being best viewed within FIG. 2. The adaptor 90 is in the shape of a hollow frustum, having a circular open top and a base which is slightly smaller in diameter than the diameter of an automobile drink holder. The adaptor 90 is attached to the bottom closure 100 by pressing its open top against the underside inner cylindrical sidewall 40 until the snap ring groove 110 of the adaptor engages the snap ring 120 of the underside cylindrical sidewall 40, which provides a film connection between these two elements and thereby creates an extension to the bottom closure 100 which will fit within standard automobile drink holders.

Also on the base of said closure 100 are features that prevent the building up of over pressure and vacuum conditions when beverage cans are inserted and withdrawn. In FIG. 5, a plurality of raised radial ribs 70 which extend from the underside inner cylindrical sidewall 40 to the outer sidewall 20 are depicted. Said ribs 70 prevent the top edge of the adaptor 90 from forming an air seal with the bottom surface of the closure 100. Further, the underside inner cylindrical sidewall 40 has been modified to contain a plurality of regions 80 in which said sidewall 40 has been notched or thinned. Said thinning prevents the outer surface of the underside inner cylindrical sidewall 40 from coming into continuous contact with the inner surface of the adaptor 90 and thereby forming an air seal that would inhibit the insertion or removal of beverage containers. Finally, a timing registration tab 130 has been illustrated on the under surface, said registration tab 130 being designed to aid in the manufacture and assembly of the device by providing a means of accurately positioning it.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A sleeve-type insulated foam beverage holder comprising:
   (a) a tubular foam insulating member having an open top and open base, an inner surface and an outer surface, and an inner radius and an outer radius;
   (b) a bottom closure, having an upper surface and a lower surface, said bottom closure being circular in shape and having a radius conformable with the outer radius of the base of said insulating member;
   (c) a plurality of circular ridges disposed on the upper surface of said bottom closure, said circular ridges being coaxial with said bottom closure, each of said circular ridges having a bottom end disposed on the upper surface and an upper end vertically spaced from said bottom end, each of said circular ridges containing an inside bevel so as to form an overhang over the upper surface of said bottom closure such that said upper end is laterally spaced from said bottom end; and
   (d) means for attaching the upper surface of said bottom closure to the base of said insulating member with said ridges in contact with said base.

2. A sleeve-type insulating foam beverage holder containing an adaptor portion for securing said beverage holder within an automobile beverage storage compartment, comprising:
   (a) a tubular foam insulating member having an open top and open base;
   (b) a bottom closure, having an upper surface and a lower surface, said bottom closure being circular in shape and having a radius conformable with the outer radius of the base of said insulating member;
   (c) means for attaching the upper surface of said bottom closure to the base of said insulating member;
   (d) a plurality of circular ridges disposed on the upper surface of said bottom closure such that said ridges are in contact with said base, said circular ridges being coaxial with said bottom closure, each of said circular ridges having a bottom end disposed on the upper surface and an upper end vertically spaced from said bottom end, each of said circular ridges containing an inside bevel so as to form an overhang over the upper surface of said bottom closure such that said upper end is laterally spaced from said bottom end; and
   (e) an adaptor portion connected to the underside of said bottom closure.

3. A sleeve-type insulating foam beverage holder according to claim 2, wherein said adaptor portion is removable and is shaped in the form of a frustum.

4. A sleeve-type insulating foam beverage holder according to claim 3, wherein said frustum is hollow with an inner surface and an outer surface, said frustum having a circular open top.

5. A sleeve-type insulating foam beverage holder according to claim 4, wherein said adaptor portion contains means for connecting said adaptor to the base of said bottom closure.

6. A sleeve-type insulating foam beverage holder according to claim 5, wherein said means for connecting said adaptor portion includes:
   (a) a short cylindrical wall on the underside of said bottom closure and coaxial therewith, said cylindrical wall having an inner surface and an outer surface and being of a diameter conformable with the circular top of said adaptor portion, and said outer surface of said cylindrical wall having a circumferential recess therein; and
   (b) a circumferential projection on said inner surface of said adaptor portion, said projection designed to mate with said circumferential recess on said outer surface of said cylindrical wall.

7. A sleeve-type insulating foam beverage holder according to claim 6, further comprising means for relieving over pressure and vacuum conditions within said insulating foam beverage holder when a beverage is inserted or removed while said adaptor portion is connected.

8. A sleeve-type insulating foam beverage holder according to claim 7, wherein said means for relieving over pressure and vacuum conditions includes:
   (a) a plurality of apertures disposed about a center of said bottom closure, said apertures lying closer to the center of said closure than an inner radius of said tubular foam insulating member;
   (b) means providing a first air passageway between said outer surface of said underside cylindrical wall and said inner surface of said adaptor member; and
   (c) means providing a second air passageway between said circular top of said adaptor portion and said lower surface of said bottom closure.

9. A sleeve-type insulating foam beverage holder according to claim 8, wherein said means for providing said first air passageway includes a plurality of longitudinal recesses formed in said outer surface of said cylindrical wall.

10. A sleeve-type insulating foam beverage holder according to claim 8, wherein said means for providing a second air passageway includes a plurality of low protrusions extending below said bottom surface of said closure, said protrusions being of equal height and contiguous with said outer surface of said cylindrical wall.

11. A sleeve-type insulating foam beverage holder according to claim 10, wherein said protrusions take the form of low radial ribs coaxial with said bottom closure, said radial ribs originating at said outer surface of said cylindrical wall and extending toward said circumference of said closure.

12. A sleeve-type insulating foam beverage holder according to claim 2, further comprising means for relieving over pressure and vacuum conditions within said insulating foam beverage holder when a beverage is inserted or removed.

* * * * *